(12) United States Patent
Vaccaro et al.

(10) Patent No.: US 10,415,723 B2
(45) Date of Patent: Sep. 17, 2019

(54) ADAPTER FOR MOUNTING CABLE HANGERS

(71) Applicant: CommScope Technologies LLC, Hickory, NC (US)

(72) Inventors: Ronald A. Vaccaro, Taylorsville, NC (US); Aviral Joshi, Chicago, IL (US); Taig S. Rajpal, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/729,716

(22) Filed: Oct. 11, 2017

(65) Prior Publication Data
US 2018/0135778 A1 May 17, 2018

Related U.S. Application Data

(60) Provisional application No. 62/420,594, filed on Nov. 11, 2016.

(51) Int. Cl.
*F16L 3/08* (2006.01)
*F16L 3/00* (2006.01)
*H02G 3/32* (2006.01)

(52) U.S. Cl.
CPC . *F16L 3/00* (2013.01); *H02G 3/32* (2013.01)

(58) Field of Classification Search
CPC ............... F16L 3/13; F16L 3/127; H02G 3/32
(Continued)

(56) References Cited

U.S. PATENT DOCUMENTS

| | | |
|---|---|---|
| 1,376,284 A | 4/1921 | Kohn |
| 1,452,497 A | 4/1923 | Fischer |

(Continued)

FOREIGN PATENT DOCUMENTS

| | | |
|---|---|---|
| FR | 2145985 A6 | 2/1973 |
| JP | 2012002323 A | 1/2012 |

(Continued)

OTHER PUBLICATIONS

Notification of Transmittal of the International Search Report and the Written Opinion of the International Searching Authority, or the Declaration corresponding to International Application No. PCT/US2017/062730 dated Mar. 13, 2018.

(Continued)

*Primary Examiner* — Todd M Epps
(74) *Attorney, Agent, or Firm* — Myers Bigel, P.A.

(57) ABSTRACT

An adapter for mounting cable hangers to a mounting structure includes: a plurality of mounting panels, each mounting panel including a mounting hole, the mounting panels attached to each other at edges thereof, each mounting panel being disposed at an angle relative to its adjacent mounting panels; two base segments, each of the base segments attached to the edge of an endmost one of the mounting panels and extending therefrom toward the other of the base segments; wherein the mounting panels and the base segments define an interior of the adapter; two locking arms, each of the locking arms extending from an end of a respective base segment away from the interior of the adapter, each of the locking arms including a locking feature, the locking arms extending generally parallel to each other and defining a gap therebetween; wherein the adapter can be deflected from a relaxed state to a deflected state by forcing the locking arms toward each other; and wherein in the deflected state the adapter may be mounted to a mounting structure, with the locking arms inserted through a hole in the mounting structure and exerting outward pressure on edges of the hole, and the locking features maintaining the adapter in a mounted position on the mounting structure.

20 Claims, 5 Drawing Sheets

(58) Field of Classification Search
USPC .................................................. 248/74.2
See application file for complete search history.

(56) References Cited

U.S. PATENT DOCUMENTS

| | | | |
|---|---|---|---|
| 2,032,413 A | 3/1936 | Hall | |
| 2,179,406 A | 11/1939 | Fitzpatrick | |
| 2,375,513 A | 8/1945 | Bach | |
| 2,453,980 A | 11/1948 | Hartmann | |
| 2,470,814 A | 5/1949 | Hain | |
| 2,495,848 A | 1/1950 | Kiesel | |
| 2,560,845 A | 7/1951 | Carpenter et al. | |
| 2,605,865 A | 8/1952 | Liptay | |
| 2,723,431 A | 11/1955 | Di Renzo | |
| 2,746,110 A | 5/1956 | Bedford, Jr. | |
| 2,990,150 A | 6/1961 | Weigel et al. | |
| 3,042,352 A | 7/1962 | Stamper | |
| 3,050,578 A | 8/1962 | Huebner | |
| 3,163,712 A | 12/1964 | Cochran | |
| 3,404,858 A | 10/1968 | Levy | |
| 3,430,904 A | 3/1969 | Soltysik | |
| 3,485,467 A | 12/1969 | Fuchs et al. | |
| 3,501,117 A | 3/1970 | Soltysik | |
| 3,536,281 A | 10/1970 | Meehan et al. | |
| 3,599,915 A | 8/1971 | Soltysik | |
| 3,916,089 A | 10/1975 | Sloan | |
| 3,981,048 A | 9/1976 | Moody et al. | |
| 4,244,542 A | 1/1981 | Mathews | |
| 4,295,618 A | 10/1981 | Morota et al. | |
| 4,306,697 A | 12/1981 | Mathews | |
| 4,344,480 A | 8/1982 | Boyer et al. | |
| 4,669,156 A | 6/1987 | Guido et al. | |
| 4,795,856 A | 1/1989 | Farmer | |
| 4,813,639 A | 3/1989 | Midkiff et al. | |
| 5,035,383 A | 7/1991 | Rainville | |
| 5,085,384 A | 2/1992 | Kasubke | |
| 5,320,312 A | 6/1994 | Hoenninger | |
| 5,393,021 A | 2/1995 | Nelson | |
| 5,587,555 A | 12/1996 | Rinderer | |
| 5,833,188 A | 11/1998 | Studdiford et al. | |
| 5,876,000 A | 3/1999 | Ismert | |
| 5,921,520 A | 7/1999 | Wisniewski | |
| 5,971,329 A | 10/1999 | Hickey | |
| 6,317,933 B1 | 11/2001 | Suenaga | |
| 6,323,430 B1 | 11/2001 | Finona | |
| 6,354,543 B1 | 3/2002 | Paske | |
| 6,899,305 B2 | 5/2005 | Korczak et al. | |
| 7,131,792 B2 | 11/2006 | Doverspike | |
| 7,384,018 B2 | 6/2008 | Moretto | |
| 7,500,644 B2 | 3/2009 | Naudet et al. | |
| 7,651,056 B2 | 1/2010 | Tjerrild | |
| 7,997,546 B1 | 8/2011 | Andersen et al. | |
| 8,020,811 B2 | 9/2011 | Nelson | |
| 8,191,836 B2 | 6/2012 | Korczak | |
| 8,439,316 B2 | 5/2013 | Feige | |
| 9,127,789 B2 | 9/2015 | Caspari et al. | |
| 9,206,927 B2 | 12/2015 | Carter et al. | |
| 9,759,880 B2 | 9/2017 | Chamberlain et al. | |
| 9,841,123 B1 | 12/2017 | White | |
| 9,853,434 B2 * | 12/2017 | Vaccaro | F16B 1/00 |
| 9,866,004 B2 | 1/2018 | Vaccaro et al. | |
| 9,879,803 B2 | 1/2018 | Leng | |
| 9,903,510 B2 * | 2/2018 | Joshi | H02G 3/32 |
| 9,995,414 B2 | 6/2018 | Joshi et al. | |
| 10,215,308 B2 | 2/2019 | Bartos | |
| 2002/0005463 A1 | 1/2002 | Korczak et al. | |
| 2003/0173470 A1 | 9/2003 | Geiger | |
| 2004/0113027 A1 | 6/2004 | Nakanishi | |
| 2004/0251386 A1 | 12/2004 | Mizukoshi et al. | |
| 2005/0109887 A1 | 5/2005 | Catapano | |
| 2005/0109890 A1 | 5/2005 | Korczak et al. | |
| 2005/0253025 A1 | 11/2005 | Benoit et al. | |
| 2006/0237217 A1 | 10/2006 | Glew | |
| 2006/0249633 A1 | 11/2006 | Korczak et al. | |
| 2007/0120023 A1 | 5/2007 | Martinez et al. | |
| 2007/0246616 A1 | 10/2007 | Budagher | |
| 2008/0093510 A1 | 4/2008 | Oh et al. | |
| 2009/0230256 A1 | 9/2009 | Widlacki et al. | |
| 2009/0242715 A1 | 10/2009 | Kosidlo et al. | |
| 2009/0294602 A1 * | 12/2009 | Korczak | F16L 3/127 248/74.2 |
| 2010/0084520 A1 | 4/2010 | Ohno | |
| 2011/0107719 A1 | 5/2011 | Kodi | |
| 2011/0226913 A1 * | 9/2011 | Feige | F16L 3/13 248/74.2 |
| 2011/0260025 A1 | 10/2011 | Aoshima et al. | |
| 2011/0283515 A1 | 11/2011 | Korczak | |
| 2012/0045608 A1 | 2/2012 | Huchet et al. | |
| 2012/0085577 A1 | 4/2012 | Eshima et al. | |
| 2012/0305724 A1 | 12/2012 | Diez Herrera et al. | |
| 2013/0104494 A1 | 5/2013 | Evangelista et al. | |
| 2013/0146720 A1 | 6/2013 | Meyers et al. | |
| 2013/0146721 A1 | 6/2013 | White | |
| 2013/0175407 A1 | 7/2013 | Williams et al. | |
| 2013/0320182 A1 | 12/2013 | Kataoka et al. | |
| 2014/0054425 A1 | 2/2014 | Jang | |
| 2014/0260083 A1 | 9/2014 | Zhang et al. | |
| 2015/0136473 A1 | 5/2015 | Jafari et al. | |
| 2015/0155669 A1 | 6/2015 | Chamberlain et al. | |
| 2015/0159781 A1 | 6/2015 | Wilson et al. | |
| 2016/0281881 A1 | 9/2016 | Vaccaro et al. | |
| 2016/0281883 A1 | 9/2016 | Vaccaro et al. | |
| 2016/0327187 A1 | 11/2016 | Brown | |
| 2016/0341340 A1 | 11/2016 | Gomes Fernandes | |
| 2018/0172183 A1 | 6/2018 | Joshi et al. | |

FOREIGN PATENT DOCUMENTS

| | | |
|---|---|---|
| JP | 2012-222986 A | 11/2012 |
| WO | WO 02/095956 A2 | 11/2002 |
| WO | WO 2008/082595 A1 | 7/2008 |

OTHER PUBLICATIONS

Notification of Transmittal of the Internationai Search Report and the Written Opinion of the International Searching Authority, or the Declaration corresponding to International Application No. PCT/US2017/062743 dated Mar. 12, 2018.
Notification of Transmittal of the International Search Report and the Written Opinion of the International Searching Authority, or the Declaration corresponding to International Application No. PCT/US2017/060115 dated Feb. 14, 2018.
Notification of Transmittal of the International Search Report and the Written Opinion of the International Searching Authority, or the Declaration corresponding to International Application No. PCT/US2017/065801 dated Apr. 13, 2018.
Notification of Transmittal of the International Search Report and Written Opinion of the International Searching Authority, or the Declaration corresponding to International Application No. PCT/US2017/068510 dated Apr. 17, 2018.
U.S. Appl. No. 15/081,177, filed Mar. 25, 2016, Vaccaro et al.
U.S. Appl. No. 15/081,240, filed Mar. 25, 2016, Vaccaro.
U.S. Appl. No. 15/335,614, filed Oct. 27, 2016, Joshi et al.
Notification of Transmittal of the International Search Report and the Written Opinion of the International Searching Authority, or the Declaration corresponding to International Application No. PCT/US2017/056109 dated Jan. 24, 2018.

* cited by examiner

ADAPTER FOR MOUNTING CABLE HANGERS

RELATED APPLICATION

This application claims priority from and the benefit of U.S. Provisional Patent Application No. 62/420,594, filed Nov. 11, 2016, the disclosure of which is hereby incorporated herein in its entirety.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and/or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. The locking projections of a hanger are inserted into a hole in the antenna tower (typically in the leg of the antenna tower) to secure the hanger to the tower. Hangers can be "stacked" onto each other by inserting the locking projections of one hanger into the large aperture of the next hanger. One variety of cable hanger of this type is the SNAP-STAK® hanger, available from CommScope, Inc. (Joliet, Ill.). Other cable hangers are shown in U.S. patent application Ser. No. 15/081,177, filed Mar. 25, 2016, Ser. No. 15/081,240, filed Mar. 25, 2016, and Ser. No. 15/335,614, filed Oct. 27, 2016, the disclosures of each of which are hereby incorporated herein by reference in full.

In some instances, it may be desirable to mount multiple stacks of cable hangers in close proximity. In such instances, it may be desirable to employ an adapter, such as that shown at 10 in FIG. 1. The adapter 10 has a trapezoidal profile, with a base panel 12 and three serially attached mounting panels 14. Each of the mounting panels 14 includes a mounting hole 16 (typically a nominal ¾ inch hole) that can receive a cable hanger such as those described above, one of which is designated 20 in FIG. 2. The base panel 12 of the adapter 10 has a hole 18 that can be used to mount the adapter 10 to a mounting structure via a bolt. The base panel 12 also includes slots 22 on either side of the hole 18 that can receive a hose clamp 26 or the like to mount the adapter 10 to a pole 24, as shown in FIG. 3. This mounting approach may be desirable when the pole 24 has no pre-formed holes to receive a typical cable hanger.

It may be desirable to provide additional configurations for mounting cable hangers.

SUMMARY

As a first aspect, embodiments of the invention are directed to an adapter for mounting cable hangers to a mounting structure. The adapter comprises: a plurality of mounting panels, each mounting panel including a mounting hole, the mounting panels attached to each other at edges thereof, each mounting panel being disposed at an angle relative to its adjacent mounting panels; two base segments, each of the base segments attached to the edge of an endmost one of the mounting panels and extending therefrom toward the other of the base segments, wherein the mounting panels and the base segments define an interior of the adapter; and two locking arms, each of the locking arms extending from an end of a respective base segment away from the interior of the adapter, each of the locking arms including a locking feature, the locking arms extending generally parallel to each other and defining a gap therebetween. The adapter can be deflected from a relaxed state to a deflected state by forcing the locking arms toward each other. In the deflected state the adapter may be mounted to a mounting structure, with the locking arms inserted through a hole in the mounting structure and exerting outward pressure on edges of the hole, and the locking features maintaining the adapter in a mounted position on the mounting structure.

As a second aspect, embodiments of the invention are directed to an adapter for mounting cable hangers to a mounting structure, comprising: a set of first mounting panels, each first mounting panel including a mounting hole, the mounting panels being serially arranged and attached to each other at end edges thereof, each mounting panel being disposed at an angle relative to its adjacent mounting panels; and a set of second mounting panels, each second mounting panel being arranged normal to the first set of mounting panels, such that mounting panels of the second set share at least one side edge with a mounting panel of the first set. The adapter further comprises: two base segments, each of the base segments attached to the edge of endmost one of the mounting panels and extending therefrom toward the other of the base segments, wherein the mounting panels and the base segments define an interior of the adapter; and two locking arms, each of the locking arms extending from an end of a respective base segment away from the interior of the adapter, each of the locking arms including a locking feature, the locking arms extending generally parallel to each other and defining a gap therebetween. The adapter can be deflected from a relaxed state to a deflected state by forcing the locking arms toward each other. In the deflected state the adapter may be mounted to a mounting structure, with the locking arms inserted through a hole in the mounting structure and exerting outward pressure on edges of the hole, and the locking features maintaining the adapter in a mounted position on the mounting structure.

DETAILED DESCRIPTION

Figure 1:
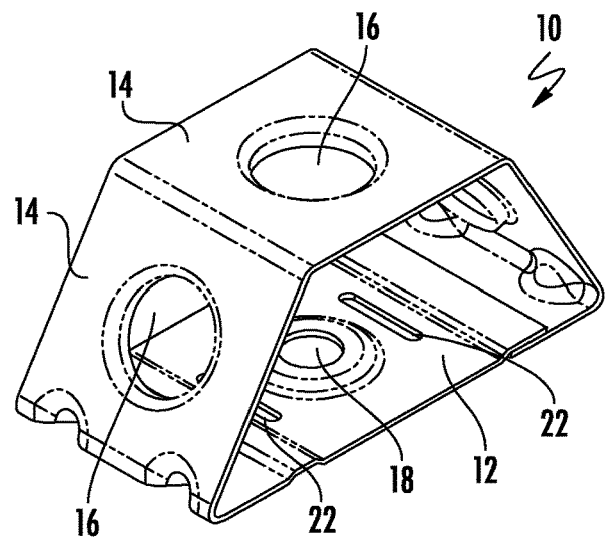
FIG. 1 is a perspective view of a prior art adapter for cable hangers.
Figure 2:
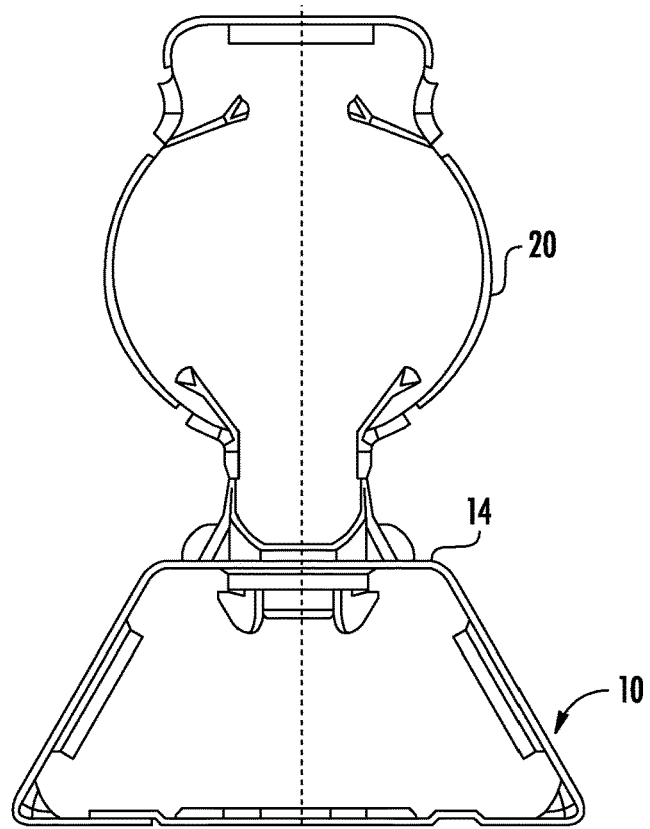
FIG. 2 is a top view of the adapter of FIG. 1 with a cable hanger mounted therein.
Figure 3:
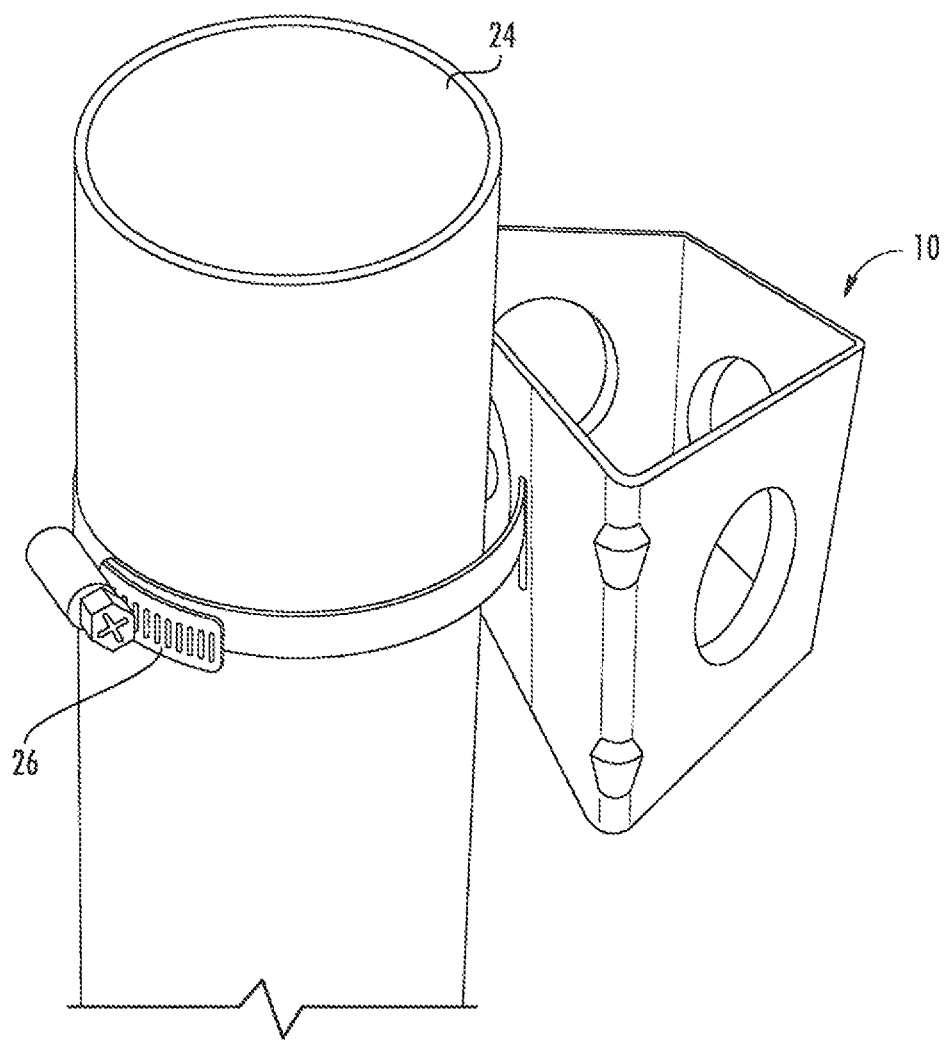
FIG. 3 is a perspective view of the adapter of FIG. 1 mounted to a pole via a hose clamp.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Also, as used herein, the terms "horizontal" and "vertical" are intended to encompass structures that may vary from precise horizontal or vertical orientations by a small amount (e.g., 5-10 degrees).

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

Figure 4:
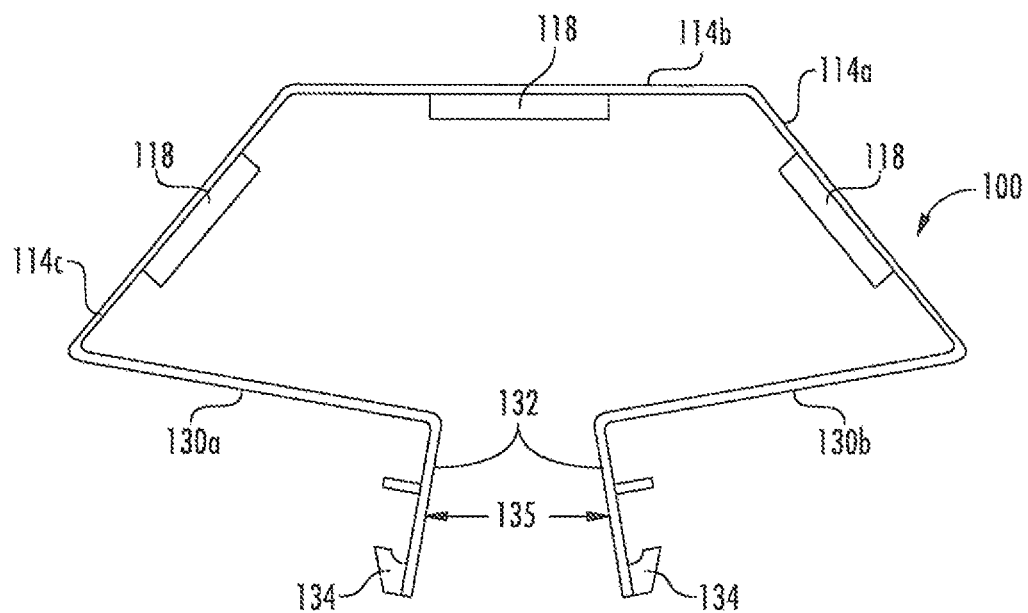
FIG. 4 is a top view of a snap-in adapter according to embodiments of the invention, with the adapter shown in its relaxed condition.
Figure 5:
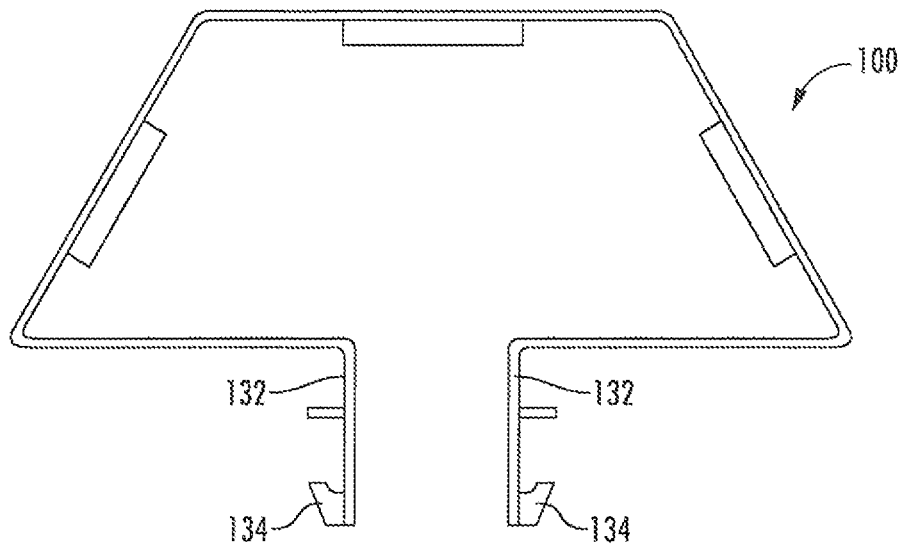
FIG. 5 is a top view of the snap-in adapter of FIG. 4 shown in a flexed condition.

Referring now to the drawings, a snap-in adapter for a cable hanger, designated broadly at 100, is shown in FIGS. 4 and 5. The adapter 100 has three mounting panels 114a, 114b, 114c, each with a hole 118 (typically a nominal ¾ inch hole), similar to the mounting panels 14 discussed above. The mounting panels 114a-c are serially arranged, with each mounting panel 114a-c sharing at least one end edge with at least one end edge of another mounting panel 114a-c. However, the adapter 100 lacks a base panel that spans the rear edges of the mounting panels 114a, 114c. Instead, the adapter 100 has two base segments 130a, 130b that extend inwardly from the rear edges of the endmost mounting panels 114a, 114c. A locking arm 132 extends rearwardly from inward edge of each of the base segments 130a, 130b. The locking arms 132 are generally parallel to each other and form a gap 135 therebetween. Locking projections 134 extend from the rear ends of the locking arms 132.

Figure 6:
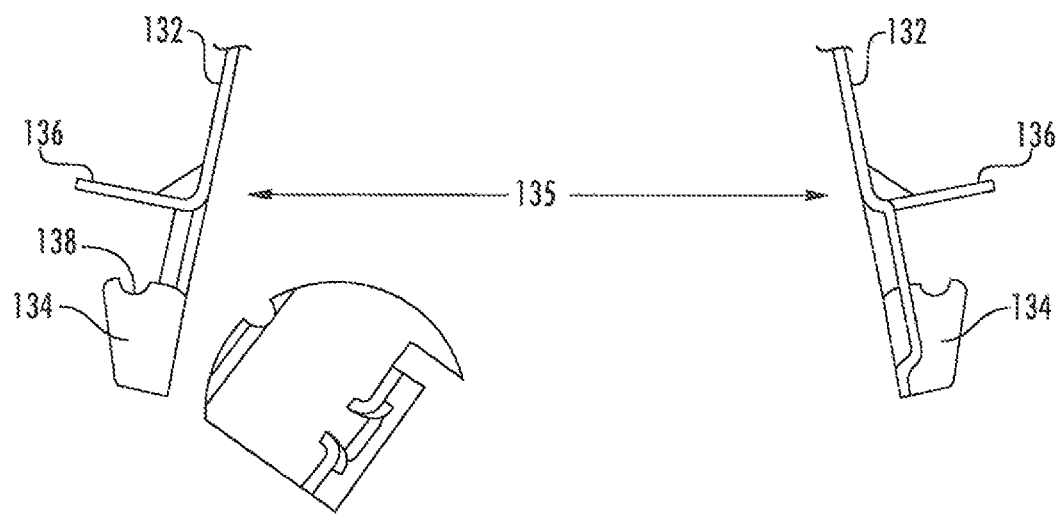
FIG. 6 is an enlarged top view of the locking projections of the adapter of FIG. 4.

Referring now to FIG. 6, the rear ends of the locking arms 132 and the locking projections 134 are shown therein. A tab 136 extends generally perpendicularly to each locking arm 132, with the tabs 136 of each locking arm 132 extending away from the tab 136 of the other locking arm 132. Also, each of the locking projections 134 has a generally semi-circular recess 138 on its forward edge 137.

The adapter 100 may be formed of a variety of materials, such as steel and other metals. The adapter 100 may be stamped from a sheet of material, such as steel, and bent by known methods into the configuration shown in FIG. 4. As such, the adapter 100 may be a monolithic component.

Figure 7:
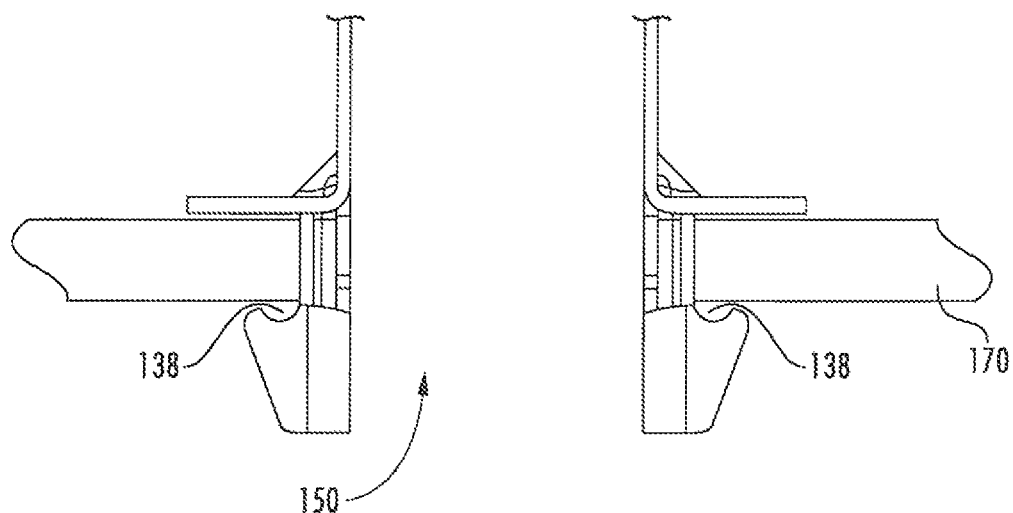
FIG. 7 is an enlarged top view of the locking projections of FIG. 6 inserted into a hold of a mounting structure.

As can be seen in FIGS. 4 and 6, in its relaxed state, the locking arms 132 of the adapter 100 splay slightly outwardly from each other. As shown in FIGS. 5 and 7, the adapter 100 can be flexed or deflected (usually by pinching the locking arms 132 toward each other) to a deflected position to reduce the space between the locking projections 134. Once the gap 135 between the locking projections 134 has been sufficiently reduced, the locking projections 134 and locking arms 132 can be inserted into a mounting hole 150 (typically a ¾ inch hole) in a mounting structure 170 (such as is shown in FIG. 7) to mount the adapter 100 in place. In the deflected position, the locking arms 132 are biased outwardly and exert pressure on the hole 150, and the locking projections 134 engage the inner surface of the mounting structure 170, thereby securing the adapter 100 to the mourning structure 170. Once the adapter 100 is mounted, cable hangers such as those discussed above can be mounted in the holes 118 in the mounting panels 114a, 114b, 114c.

As can be seen in FIG. 7, when the locking projections 134 are inserted into a mounting hole 150 of a mounting structure 170, the tabs 136 overlie the outer surface of the mounting structure 170. The locking projections 134 engage the inner surface of the mounting structure 170. As shown in FIG. 7, the recess 138 can help the locking projections 134 to "catch" the inside corner of the hole 150 of the mounting structure 170, thereby improving the retention of the locking projections 134.

Figure 8:
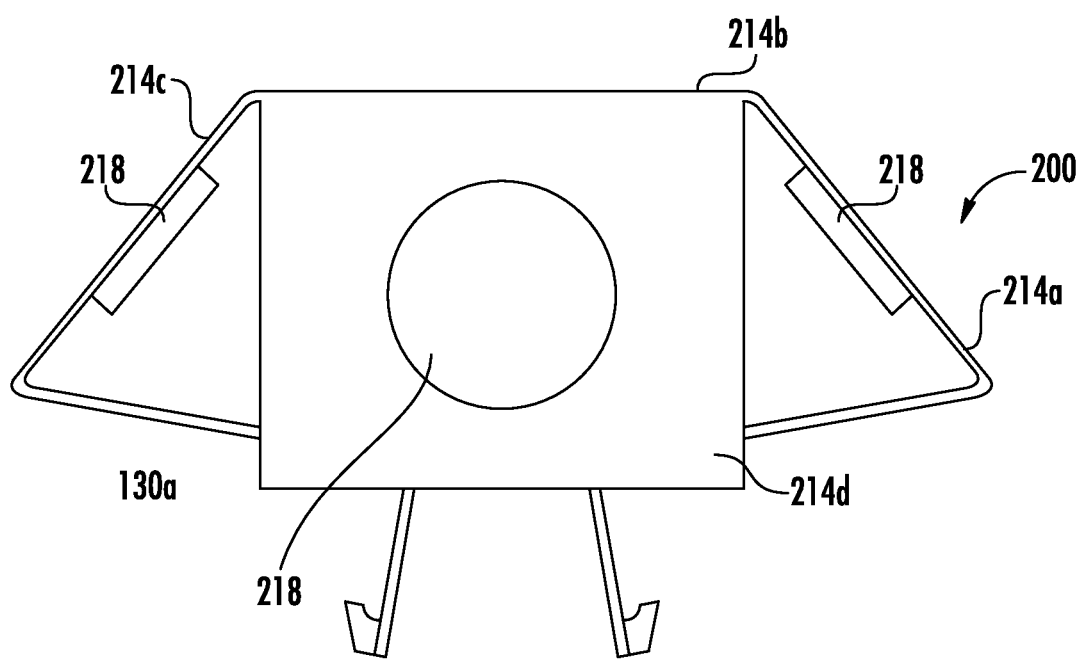
FIG. 8 is a top view of a snap-in adapter according to additional embodiments of the invention.

Although the adapter 100 is shown with three mounting panels 114a, 114b, 114c, other configurations with more or fewer mounting panels are contemplated. For example, FIG. 8 illustrates an adapter 200 that has five mounting panels: panels 214a, 214b, 214c that are similar to mounting panels 114a, 114b, 114c discussed above, a top panel 214d that is positioned above and is normal to the panels 214a, 214b, 214c, and a bottom panel (not visible in FIG. 8) that is below the mounting panels 114a, 114b, 114c and parallel with the top panel 214d. Each of the top and bottom mounting panels shares a side edge with the mounting panel 214b. Each of the mounting panels of the adapter 200 includes a hole 218 in which a cable hanger can be mounted. The adapter 200 can therefore provide mounting locations for up to five cable hangers, and can provide two mounting locations for cables (i.e., in the top and bottom mounting panels) that are oriented to be perpendicular to the cables mounted in the other three mounting locations.

In the illustrated embodiment, the top panel 214d and the unseen bottom mounting panel are attached to the side edges of the mounting panel 214b. However, the top and bottom mounting panels may also be attached to the side edges of either of the other mounting panels 214a, 214c.

Also, although the adapters 100, 200 take generally a trapezoidal profile, those skilled in this art will appreciate that the adapters may be configured to take other profiles. For example, the mounting panels 114a, 114c may be generally perpendicular to the mounting panel 114b, such that the adapter has a square or rectangular profile. In other embodiments, the adapter may have only two mounting panels and therefore have a triangular profile. Pentagonal, hexagonal, and other profile shapes are also contemplated.

The adapters 100, 200 illustrated and described herein may be formed of a variety of materials, such as steel and other metals. In some embodiments, the adapters may be stamped from a sheet of material, such as steel, and bent by known methods into the configuration shown.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An adapter for mounting cable hangers to a mounting structure, comprising:
    a plurality of mounting panels, each mounting panel including a round mounting hole, the mounting panels attached to each other at edges thereof, each mounting panel being disposed at an angle relative to its adjacent mounting panels;
    two base segments, each of the base segments attached to the edge of an endmost one of the mounting panels and extending therefrom toward another of the base segments;
    wherein the mounting panels and the base segments define an interior of the adapter;
    first and second locking arms, each of the locking arms extending from an end of a respective one of the base segments away from the interior of the adapter, each of the locking arms including a locking feature, the first locking arm extending generally parallel to the second locking arm and defining a gap therebetween;
    wherein the adapter is configured to be deflected from a relaxed state to a deflected state in which the locking arms are deflected toward each other;
    wherein in the deflected state the adapter may be mounted to a mounting structure, with the locking arms inserted through a hole in the mounting structure and exerting outward pressure on edges of the hole, the locking features being configured to maintain the adapter in a mounted position on the mounting structure.

2. The adapter defined in claim 1, wherein the mounting panels and the base segments generally define a trapezoidal interior.

3. The adapter defined in claim 1, wherein the mounting panels and the base segments define generally a rectangular interior.

4. The adapter defined in claim 1, wherein all of the mounting panels are serially arranged, with each mounting panel sharing at least one end edge with at least one other mounting panel.

5. The adapter defined in claim 1, wherein a first set of the mounting panels is serially arranged, with each mounting panel of the first set sharing at least one end edge with at least one other mounting panel of the first set and a second set of the mounting panels is arranged normal to the first set, such that mounting panels of the second set share at least one side edge with a mounting panel of the first set.

6. The adapter defined in claim 1, wherein the locking features are configured for insertion into a nominal ¾ inch diameter hole in the mounting structure.

7. The adapter defined in claim 1, wherein the holes in the mounting panels are nominally ¾ inch in diameter.

8. The adapter defined in claim 1, wherein the plurality of mounting panels comprises three mounting panels.

9. The adapter defined in claim 1, wherein the locking features comprise locking projections.

10. The adapter defined in claim 9, wherein each of the locking projections comprises a recess positioned and configured to engage a corner of the hole of the mounting structure.

11. The adapter defined in claim 9, wherein each locking arm comprises a tab extending generally perpendicular thereto, the tab on each locking arm extending toward the tab on the other locking arm.

12. The adapter defined in claim 1, wherein the adapter is formed as a monolithic component.

13. The adapter defined in claim 1, wherein the adapter comprises a metallic material.

14. An adapter for mounting cable hangers to a mounting structure, comprising:
- a set of a plurality of first mounting panels, each first mounting panel including a mounting hole, the mounting panels being serially arranged and attached to each other at end edges thereof, each mounting panel being disposed at an angle relative to its adjacent mounting panels;
- and a set of second mounting panels, each second mounting panel including a mounting hole, each second mounting panel being arranged normal to the first set of mounting panels, such that mounting panels of the second set share at least one side edge with a mounting panel of the first set;
- two base segments, each of the base segments attached to the edge of an endmost one of the mounting panels and extending therefrom toward another of the base segments;
- wherein the mounting panels and the base segments define an interior of the adapter;
- first and second locking arms, each of the locking arms extending from an end of a respective one of the base segments away from the interior of the adapter, each of the locking arms including a locking feature, the first locking arm extending generally parallel to the second locking arm and defining a gap therebetween;
- wherein the adapter can is configured to be deflected from a relaxed state to a deflected state in which the locking arms are deflected toward each other;
- wherein in the deflected state the adapter may be mounted to a mounting structure, with the locking arms inserted through a hole in the mounting structure and exerting outward pressure on edges of the hole, the locking features configured to maintain the adapter in a mounted position on the mounting structure.

15. The adapter defined in claim 14, wherein the mounting panels and the base segments generally define a trapezoidal interior.

16. The adapter defined in claim 14, wherein the mounting panels and the base segments define generally a rectangular interior.

17. The adapter defined in claim 14, wherein the locking features are configured for insertion into a nominal ¾ inch diameter hole in the mounting structure.

18. The adapter defined in claim 14, wherein the holes in the mounting panels are nominally ¾ inch in diameter.

19. The adapter defined in claim 14, wherein the adapter is formed as a monolithic component.

20. The adapter defined in claim 14, wherein the adapter comprises a metallic material.

\* \* \* \* \*